(12) United States Patent
Seedman et al.

(10) Patent No.: US 7,010,298 B2
(45) Date of Patent: Mar. 7, 2006

(54) METHOD AND APPARATUS FOR DETECTING THE PRESENCE OF A WIRELESS NETWORK

(75) Inventors: Michael Seedman, Highland Park, IL (US); Bruno Marchevsky, Evanston, IL (US); David Gary Padgitt, Schaumburg, IL (US)

(73) Assignee: Chrysalis California L.L.C., Trabuco Canyon, CA (US)

( * ) Notice: Subject to any disclaimer, the term of this patent is extended or adjusted under 35 U.S.C. 154(b) by 0 days.

(21) Appl. No.: 10/443,639

(22) Filed: May 22, 2003

(65) Prior Publication Data

US 2004/0132446 A1 Jul. 8, 2004

Related U.S. Application Data

(60) Provisional application No. 60/383,256, filed on May 24, 2002.

(51) Int. Cl.
*H04Q 7/20* (2006.01)

(52) U.S. Cl. ................ 455/434; 455/426.2; 455/161.1; 455/552.1

(58) Field of Classification Search ................ 455/421, 455/422.1, 432, 426.2, 436–444, 307, 200, 455/434, 552.1, 553, 435.2, 161.1; 370/328, 370/331, 338, 351–356, 401, 489, 349
See application file for complete search history.

(56) References Cited

U.S. PATENT DOCUMENTS

| | | |
|---|---|---|
| 5,574,979 A | 11/1996 | West |
| 6,006,071 A | 12/1999 | Roberts et al. |
| 6,035,212 A | 3/2000 | Rostoker et al. |
| 6,477,156 B1 | 11/2002 | Ala-Laurila et al. ........ 370/331 |
| 6,487,180 B1 | 11/2002 | Borgstahl et al. ........... 370/310 |
| 6,493,550 B1 * | 12/2002 | Raith ....................... 455/422.1 |
| 6,804,496 B1 * | 10/2004 | Carlson et al. .......... 455/67.15 |
| 2001/0052840 A1 | 12/2001 | Ghosh et al. ............... 340/7.43 |
| 2002/0059453 A1 | 5/2002 | Eriksson et al. ............ 709/238 |
| 2002/0097182 A1 | 7/2002 | Goren et al. ........... 342/357.07 |
| 2002/0098852 A1 | 7/2002 | Goren et al. ................ 455/456 |
| 2002/0160769 A1 | 10/2002 | Gray .......................... 455/423 |
| 2003/0003902 A1 | 1/2003 | Ramakesavan et al. ..... 455/420 |
| 2003/0021250 A1 | 1/2003 | Willins et al. .............. 370/338 |
| 2003/0078037 A1 | 4/2003 | Auckland et al. ........... 455/422 |
| 2003/0096629 A1 * | 5/2003 | Elliott et al. ................ 455/522 |
| 2003/0108062 A1 | 6/2003 | Agrawal et al. ............ 370/463 |
| 2003/0119494 A1 * | 6/2003 | Alanara et al. ............. 455/421 |
| 2003/0120809 A1 | 6/2003 | Bellur et al. ................ 709/239 |
| 2003/0125043 A1 | 7/2003 | Silvester ..................... 455/456 |
| 2003/0134636 A1 * | 7/2003 | Sundar et al. .............. 455/432 |

(Continued)

OTHER PUBLICATIONS

Experimental Results for Interference between Bluetooth and IEEE 802.11 DSSS Systems, Vehicular Technology Conference, 2001, VTC 2001, IEEE VTS 54TH, vol. 1, 2001.

(Continued)

*Primary Examiner*—Jean Gelin
(74) *Attorney, Agent, or Firm*—McDonnell Boehnen Hulbert & Berghoff LLP

(57) ABSTRACT

A system and method for detecting the presence of a wireless LAN. The system includes a radio frequency receiver for receiving radio frequency signals and a controller having associated programming for controlling the receiver. The programming also functions to measure and analyze the energy of the received radio frequency signals for the purpose of determining if the radio frequency signals indicate the presence of a wireless LAN or are being produced by a noise generating electronic device.

27 Claims, 7 Drawing Sheets

U.S. PATENT DOCUMENTS

| | | | |
|---|---|---|---|
| 2003/0134650 A1* | 7/2003 | Sundar et al. | 455/465 |
| 2003/0152037 A1 | 8/2003 | Howard | 370/252 |
| 2003/0157895 A1 | 8/2003 | Agrawal et al. | 455/67.1 |
| 2003/0179708 A1 | 9/2003 | Kamerman et al. | 370/241 |

OTHER PUBLICATIONS

PCT International Preliminary Examination Report for the PCT Counterpart to the present application, dated Aug. 18, 2004.

Ratish J. Punnoose et al., Experimental Results for Interference between Bluetooth and IEEE 802.11b DSSS Systems, Vehicular Technology Conference, 2001, VTS 2001, IEEE VTS 54$^{th}$, vol. 1, 2001.

PCT International Preliminary Examination Report for International Application No. PCT/US03/1638, which claims priority to U.S. Appl. No. 60/383,256, which is a parent application of U.S. Appl. No. 10/443,639, Aug. 18, 2004.

Wi-Fi Sniffer (Model WFS-1), http://idetect.com.sg/WiFi.htm, printed from the World Wide Web as archived on Jan. 24, 2003.

WLAN Products, http://bvsystems.com/Products/WLAN/WLAN.htm, printed from the World Wide Web as archived on Dec. 13, 2002.

Site Master, http://www.us.anritsu.com/products/showProd.asp?prod=45, printed from the World Wide Web as archived on Feb. 14, 2002.

WLANBIT TriCycle, http://wlanbit.com/products.html, printed from the World Wide Web as archived on Feb. 6, 2003.

Microwave Oven Leakage Meters, http://www.lessemf.com/mw-open.html, printed from the World Wide Web as archived on Apr. 8, 2003.

2450 MHz—Microwave Leakage Meters and Area Monitors, http://www.rellpower.com/ipgcw_2450miclkgmeter.asp, printed from the World Wide Web as archived on Jan. 23, 2003.

Microwave Leakage Detector 840024, http://www.technika.com/Sper/s840024.htm, printed from the World Wide Web as archived on Apr. 18, 2003.

Microwave oven leak detector with digital readout, http://www.comforthouse.com/comfort/micleakdetwi.html, printed from the World Wide Web as archived on Jun. 17, 2002.

Tranzeo Wireless Technologies—802.11b lan cards, switches, hubs, wireless networks, for home, office, school and more, 80211, 80211b, http://www.tranzeo.com/products.php3, printed from the World Wide Web as archived on Feb. 1, 2003.

Netstumbler.com—The World of WiFi, http://www.netstumbler.com/download.php?op=viewdownload&CID=1&orderby=hitsD, printed from the World Wide Web as archived on Feb. 8, 2003.

* cited by examiner

METHOD AND APPARATUS FOR DETECTING THE PRESENCE OF A WIRELESS NETWORK

RELATED APPLICATION

This application claims the benefit of U.S. Provisional Patent Application Ser. No. 60/383,256 filed on May 24, 2002 which is incorporated herein by reference in its entirety.

BACKGROUND

The present invention, and the various embodiments thereof, relate to wireless network communications and, in particular, to the detection of a wireless computer network that is available to a mobile device user.

The demand for wireless communications has enjoyed tremendous growth over recent years and indeed, wireless communication technology is used every day by millions around the world to send, receive, and exchange information using pagers, cellular telephones, wireless personal digital assistants, and other wireless communication products. Recently, the revolution in wireless communication technologies has carried over to business and personal computing. Wireless communication technology now permits computer users to access and share information and data, without being tethered by wire to a computer network infrastructure traditionally used to connect computing devices.

The computer network infrastructure traditionally used to connect computing devices generally relies upon the implementation of standard local area network (LAN) protocols, including Ethernet. These protocols permit organizations of every size to construct computer networks comprised of multiple computing devices connected to one another via hardwire connections. The traditional hardwired LAN provides for the high speed exchange of data using relatively inexpensive network connection devices. Indeed, a computer network is an essential requirement for operating a modern business enterprise. Employees of virtually every size business gain access to and share information and data over a digital LAN. Until recently, LANs required that the computing devices be interconnected using physical hardwired connections or network adapters forming the network infrastructure. Even computer users using portable laptop and notebook computers were relegated to having to connect these devices via a hardwired connection to the company infrastructure in order to gain access to the company network and its various resources, including data storage, modems, gateways, and printing devices.

The recent development and commercialization of wireless communications has now carried over to the corporate and indeed even the home LAN. Wireless network services offer great benefit to the mobile computer user. For example, the mobile user need not carry cumbersome cables and connectors to connect to a hard-wired network. Of course, the major benefit of a wireless LAN is the increased portability of computing devices used within such an infrastructure. Freed from the physical connections tying computing devices to the network, network users are free to move about the home or workplace without restriction, and are able to access a wireless LAN from nearly every location covered by the wireless network. On the other hand, wireless network services typically operate on unlicensed portions of the frequency spectrum where other potentially interfering and competing devices also operate.

A wireless LAN is typically implemented using radio transceivers which provide a wireless connection between the computing devices, or peripherals, and the network backbone comprised of other computers, servers, and peripherals. One or more transceivers are typically configured as wireless access points (WAPs). Wireless access points are, in turn, connected via a physical hardwire infrastructure to the computer network. The WAP further communicates via a radio link with radio transceivers associated with the computing devices of a user. Devices such as laptop or notebook computers, desktop computers, and even printers can be equipped with a wireless PC card, or wireless network adapter, containing the transceiver which communicates with the WAP.

Owing to the increased availability of wireless networks, laptop and notebook computer users are able to perform their tasks with increased mobility. For example, a user can take his or her laptop from their desk into a conference room to attend a meeting and still have access to the network to retrieve data and have access to the Internet via one or more modems or gateways present on the network—all without being tethered by a wired connection. Similarly, mobile computer users and business travelers commonly use their portable computers to gain access to their email accounts, to determine if there is any unread email, and to read and send email. Still further, being able to connect to the Internet permits the user to perform these tasks and others without having to suffer through the lackluster performance provided by conventional 56 K modem connections which use the telephone network to establish communications. Indeed, high speed Internet access via a WAP is highly desirable when considered vis-a-vis a connection made via use of a conventional 56 K modem. Thus, as more and more laptop and notebook computers are being equipped with integrated wireless network adapters, the implementation of wireless LANs in the business environment, and even within residences, is surely to expand.

A further expansion of the use of wireless computer networks now permits laptop and notebook computer users to use their portable computing devices to access public and private computer networks at locations away from their own office or home networks. Internet service providers, telecommunications companies, and wireless network providers have begun to install WAPs in locations such as airport lounges, hotel lobbies, and coffee bars. WAPs are being established at these and other public locations where business travelers and general computer users often congregate. These types of public WAPs are typically referred to as "hotspots." A typical hotspot permits a wireless computer user to gain access to a computer network via a wireless connection created between the wireless network adapter in the user's computer and the public WAP. The hotspot WAP permits the user to gain access to an IP address associated with a modem or gateway to enable the computer user to access the Internet and, potentially, other local network resources, such as printers, which are associated with the hotspot.

Public access points may be associated with "open networks" as well as "closed networks." An open network, for purposes of this disclosure, is a network associated with a public WAP which is accessible to computer users without the need to have previously subscribed to the network operated by the WAP provider. A closed network, for purposes of this disclosure, is a network associated with a public WAP which is accessible to computer users who are already registered users of the network and who, in all likelihood, have paid a fee for such access. A closed network will typically present the user with a login screen, procedure, or script, which may require the user to provide a user name and password to gain access to the network associated with the WAP. An open network may not require any formal login.

In practice, a mobile computer user, such as business traveler carrying a notebook computer, may come upon an airport waiting area or hotel lobby equipped with a WAP. While printed signs may advertise the presence of a WAP, the user has no idea whether the network is indeed active, whether the wireless signal extends to where the user is sitting, or whether the signal strength is adequate to permit a reliable connection to be made with the network. Thus, to attempt to connect to a network via a WAP, the mobile computer user is required to unpack their computer, turn the computer on, wait for it to boot, perform any necessary network configuration, and thereafter launch a web browser before they are able to determine if it is indeed possible to gain access to the network via the WAP, let alone browse the Internet or check for the presence of unread email. As will be appreciated, these steps are found to be very time consuming and frustrating for consumers, especially when it is determined that the WAP fails to exist or is not capable of providing adequate network access.

SUMMARY

To provide a more convenient means for accessing a wireless network, the following describes examples of systems and methods for detecting the presence of a computer network. In this regard, the systems and methods described hereinafter may be used in connection with a wireless communication apparatus which indicates to a computer user the existence of a wireless computer network without requiring use of their computer. In addition, the systems and methods described hereinafter may be utilized in connection with a portable handheld wireless communication device which permits a mobile computer user to gain access to a wireless LAN and determine whether unread email is present, all without the need of booting one's laptop computer. Still further, the systems and methods described hereinafter may be used in connection with a portable wireless device which is capable of identifying and/or displaying the public and private wireless networks which are available at a given location.

A better understanding of the objects, advantages, features, properties and relationships of such exemplary embodiments will be obtained from the following detailed description and accompanying drawings which further demonstrate the various ways in which the principles of the subject systems and methods may be employed.

BRIEF DESCRIPTION OF THE DRAWINGS

For a better understanding of the exemplary systems and methods for detecting the presence of a computer network which are described hereinafter, reference may be had to preferred embodiments shown in the following drawings in which.

DETAILED DESCRIPTION

Figure 1:
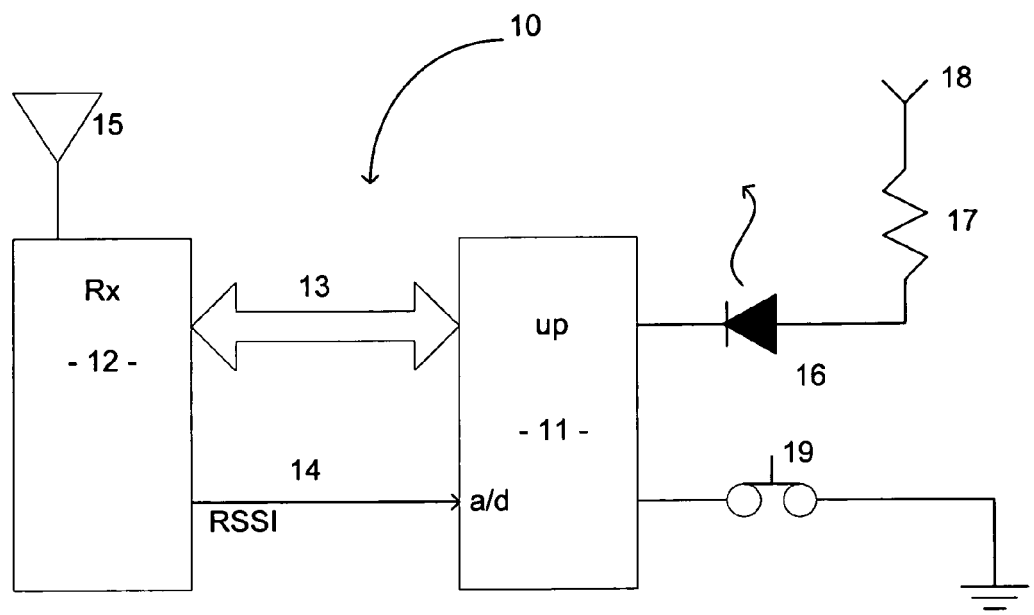
FIG. 1 illustrates a block diagram representation of an exemplary system for use in determining the presence of a wireless network.
Figure 8:
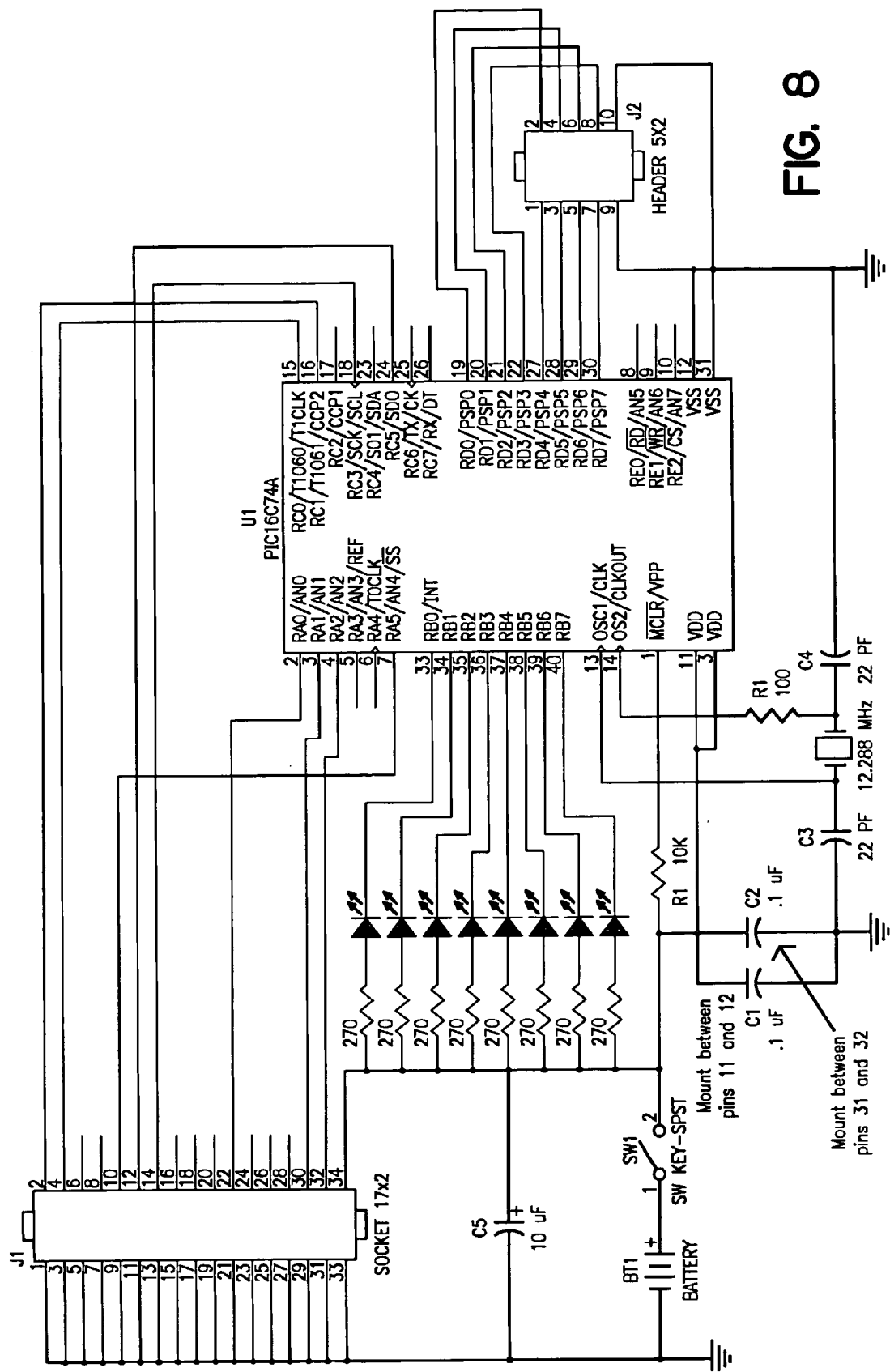
FIG. 8 illustrates an exemplary schematic diagram representation of the system of FIG. 1.
Figure 9A:
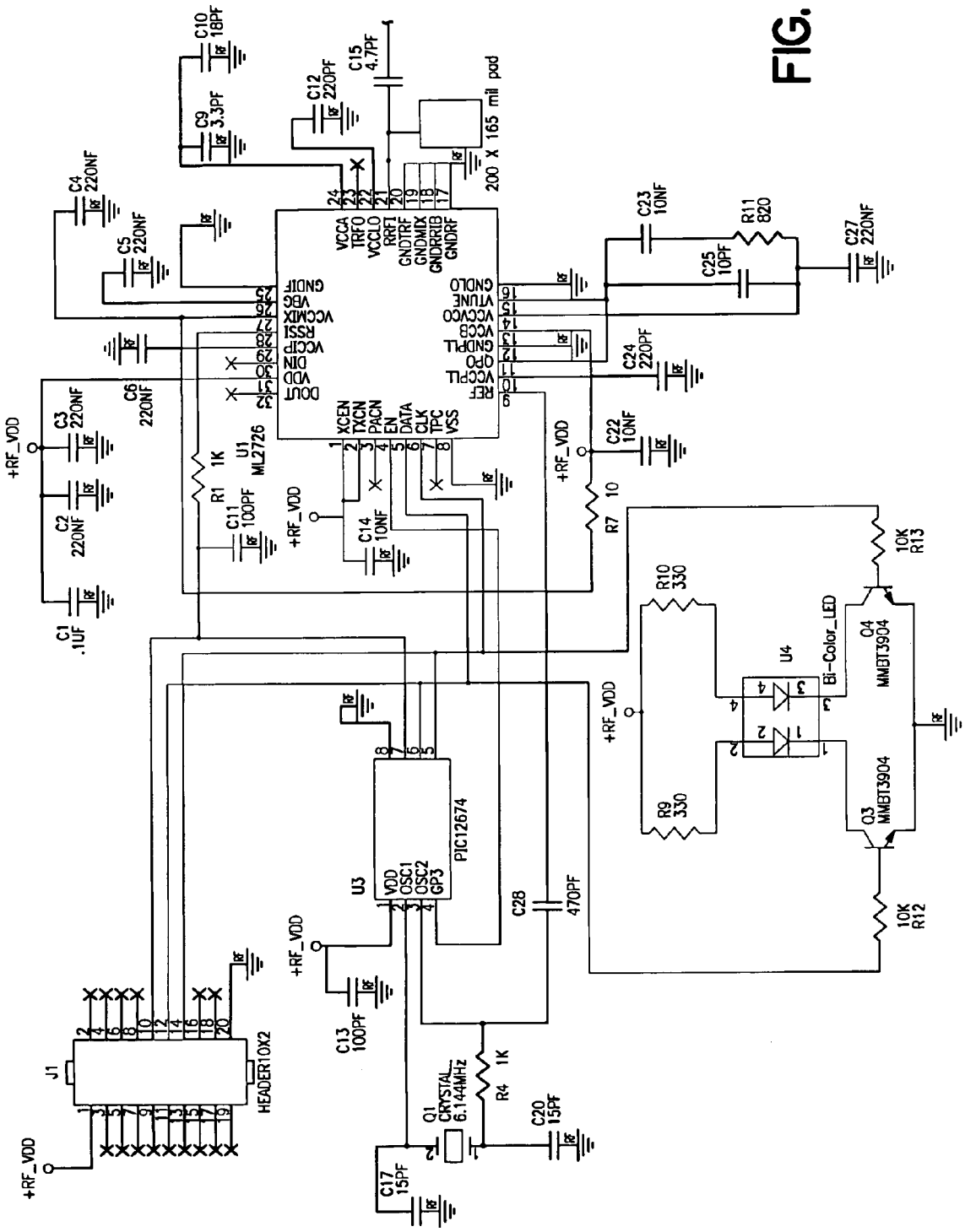
FIG. 9 illustrates an exemplary schematic diagram representation of a further embodiment of the present invention.
Figure 9B:
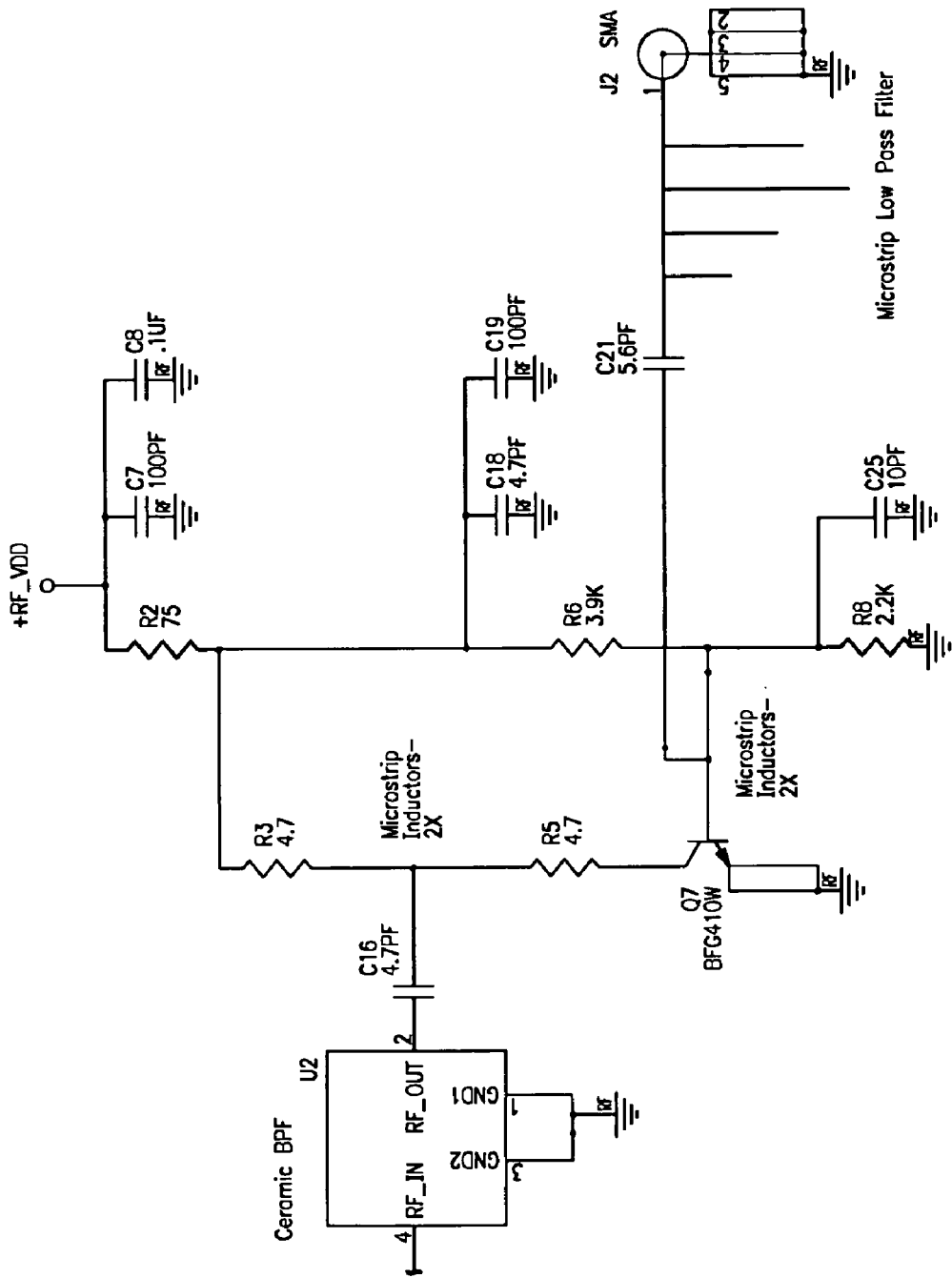

Turning now to the figures, wherein like reference numerals refer to like elements, exemplary systems and methods for detecting the presence of a computer network are hereinafter described. To this end, FIG. 1 illustrates a block diagram representation of an exemplary system 10 which functions as a passive detector for purposes of determining the presence of a wireless network. In the illustrative example, the system 10 includes a microprocessor 11 that operates in conjunction with a radio receiver 12 to determine the presence of a wireless network and, in particular, to discriminate between a wireless computer network implementing the 802.11 protocols (e.g., 801.11b a.k.a. WiFi and 802.11a a.k.a. WiFi5) and other in-band non-network sources of radio frequency energy and sources of radio frequency interference such as microwave ovens, Bluetooth devices and 2.4 GHz cordless telephones. As will be appreciated, the radio receiver 12 operates under the control of the microprocessor 11, via a bus 13, and the microprocessor 11 may comprise one of the class of microprocessor devices which incorporate onboard logic as well as a ROM and/or RAM in which instructions for controlling the operation of the system could be stored. By way of further example, FIG. 8 illustrates a schematic diagram of the system 10 wherein receiver 12, connected via socket J1, is radio transceiver chip type Micro Linear ML2725 in which only the receiver is used. FIG. 9 illustrates a schematic diagram of a further embodiment of the present invention.

For use in detecting the presence of a computer network, the microprocessor 11 preferably includes instructions for causing the receiver 12 to scan the frequency bands utilized in implementing 802.11 wireless networks as described hereinafter in connection with FIG. 4. Scanning of the frequency bands by the receiver 12 may be made possible through use of an antenna 15 that is connected to the receiver 12. The antenna 15 allows the receiver 12 to receive ambient radio signal in response to which the receiver 12 outputs a Received Signal Strength Indication (RSSI) signal. The RSSI signal may then be supplied to an analog-to-digital converter input port on the microprocessor 11 via, for example, a communication line 14 that links the receiver 12 to the analog-to-digital converter input port.

To cause the system 10 to scan the frequency bands, the mobile computer user may depress a switch 19 which causes the software program stored within microprocessor 11 to execute. The microprocessor 11 would then drive receiver 12 causing it to scan the various 802.11 frequencies and to measure the energy of any received signals within the relevant band. A signal indicative of the signal strengths are, in turn, provided to the microprocessor 11 where the information is used to discriminate between an 802.11 wireless computer network and devices such as, for example, microwave ovens and cordless phones.

Figure 2:
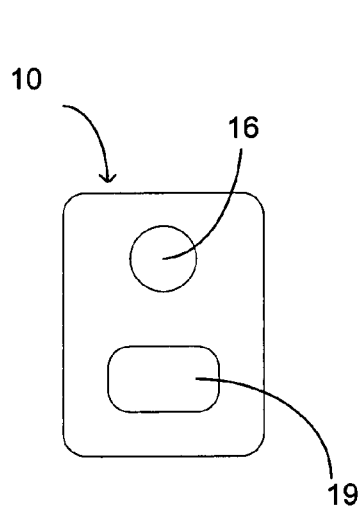
FIG. 2 illustrates the system of FIG. 1 embodied in a first handheld device.

To provide for ease of use, the above-described system 10 may be embodied in a handheld device 10 having a single switch 19 and single LED 16 connected to a power supply 18 via means of a resistor 17 as is illustrated in FIGS. 1 and 2. While not required, it will be appreciated that the LED 16 can comprise a tri-colored LED, where the LED glows red to indicate that a wireless network has not been detected, yellow to indicate that a wireless network may be present and green to indicate that indeed a wireless network has been detected as being present. Such a tri-colored LED 16 would be driven by the microprocessor 111 according to its programming and as a function of the signal(s) received from the receiver 12.

Figure 3:
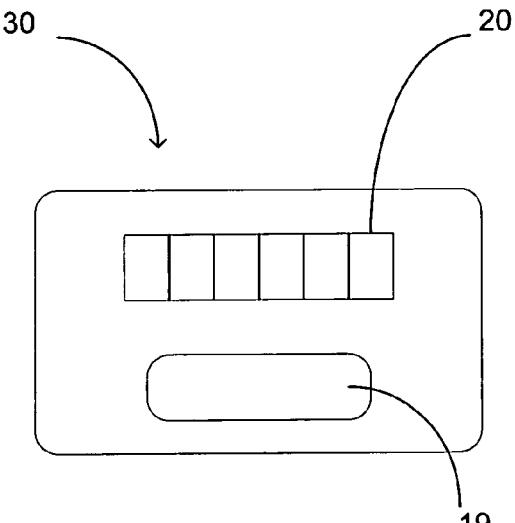
FIG. 3 illustrates the system of FIG. 1 embodied in a second handheld device.

Alternatively, the above-described system 10 may be embodied in a handheld device 30 having a single switch 19 accompanied by a multi-segment display 20 comprising a plurality of LEDs as is illustrated in FIG. 3. In this illustrated embodiment, the number of LEDs illuminated may correspond to the relative received signal strength as measured by the system towards providing the user with further information as to the perceived strength of the signal associated with the detected wireless computer network. Again, the display 20 would be driven by the microprocessor 11 according to its programming and as a function of the signal(s) received from the receiver 12. It will also be appreciated that an analog meter, illuminating LCD segments, etc. can be used for this same purpose.

Thus, through use of the systems illustrated in FIGS. 1–3, it will be seen that a mobile computer user can easily verify the presence of a wireless computer network without having to ever turn on their computer.

To determine the presence of a wireless computer network, the software associated with the microprocessor 11 may cause the receiver 12 to scan the relevant 802.11 frequency band and receive the ambient radio signal and generate a received signal strength indication. To this end, the system may operate to initially scan just outside of the 802.11 band looking at the noise outside the band in an attempt to identify the energy level "out-of-band." If the measured signal energy out-of-band is significant, it can be concluded that the received signal is most likely emanating from a microwave oven or other broadband sources, inasmuch as a microwave oven or these sources when operating may spread a great deal of "noise" across a wide band spectrum. For example, software resident in microprocessor 11 may cause the receiver 12 to scan the 802.11 B frequency band starting somewhat low, outside of the band "L," and ending high, outside of the band "U."

Figure 4:
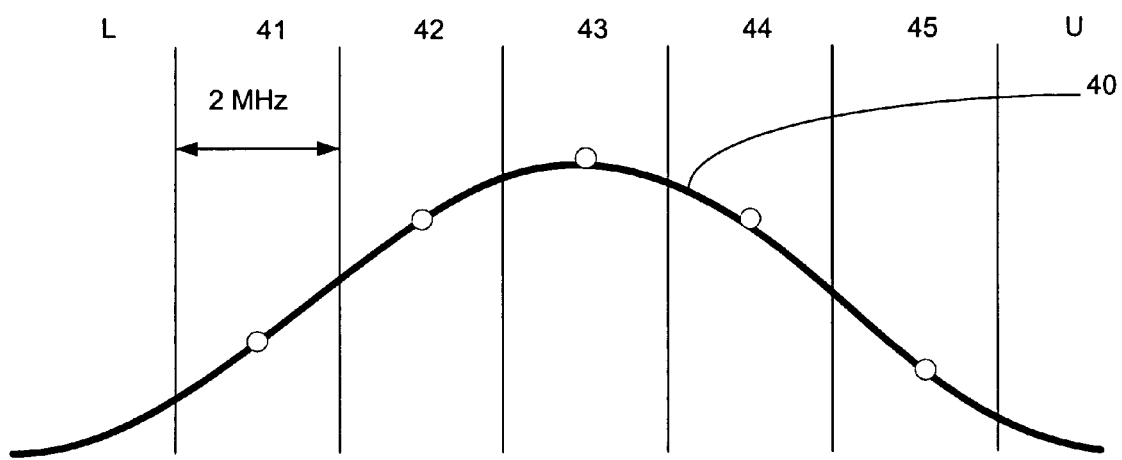
FIG. 4 illustrates an exemplary 802.11 frequency spectrum.

The overall frequency band could also be scanned in 2 MHz steps, 41–45 as illustrated in FIG. 4, where the results are integrated over time such that the overall energy level of the band may be measured. If the software associated with the microprocessor 11 determines that the energy level is somewhat constant over time, and that the energy level exceeds a predefined threshold, the signal received by the receiver 12 may be deemed to be that emanating from an 802.11 wireless network. In this regard, it is to be appreciated that 802.11b transceivers will typically keep transmitting short bursts of data and then switch to a receive mode. However, it can be expected that the frequency of the bursts will be contained within one 802.11b channel. Thus, if the peak energy level is detected as moving and/or the overall energy level is fluctuating and/or appearing and disappearing, it can be assumed that the received signal is not emanating from a wireless network but instead emanating some noise generating electronic device such as a microwave oven, Bluetooth or cordless phone source. Bluetooth and other Frequency Hopping Spread Spectrum ("FHSS") schemes would be "jumpy" in frequency as well as time. Indeed, a microwave oven when operating spreads a great deal of "noise" across a wide band spectrum in intermittent short bursts of energy, i.e., microwave ovens are pulsed at 60 Hz, and its energy would appear in every channel at $\frac{1}{60}$ seconds which is easy to detect. On the other hand, a cordless telephone typically operates by remaining on much longer and with a higher duty cycle. Analog cordless telephones can be recognized right away by detecting a constant carrier thereby discriminating wireless cameras and inexpensive cordless phones. Similarly, since digital cordless telephones can operate using a FHSS or Direct Sequence Spread Spectrum ("DSSS") scheme, telephones using these schemes can be identified by their duty cycle. A cordless telephone utilizing a FHSS scheme can be spotted by the appearance of signals in several 802.11b channels. While DSSS telephones can be more difficult to recognize, since some DSSS telephones transmit over long periods of time, such telephones can be detected by analyzing the duty cycle of the detected signal. The characteristics of a wireless network can thus be detected by the system and its existence discriminated from other radio frequency sources operating within the same band as a 802.11 wireless network.

Figure 5:
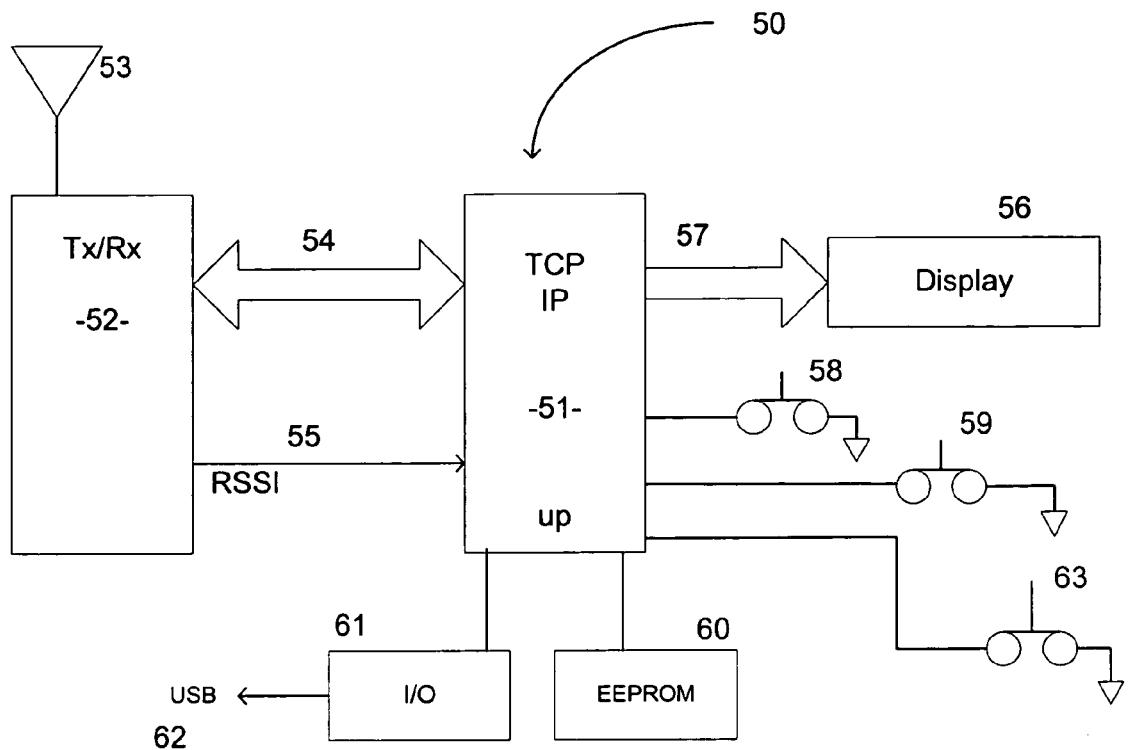
FIG. 5 illustrates a block diagram representation of a further exemplary system for use in determining the presence of a wireless network and for communicating with the wireless network.

An alternative system 50 that provides enhanced functionality to the user by operating not only as a passive device capable of identifying the presence of a wireless computer network, but also as an active device able to affirmatively interrogate or otherwise communicate with a wireless computer network, as well as communicate with the Internet towards carrying out a variety of functions, is illustrated in FIG. 5. For performing these functions, the system illustrated in FIG. 5 comprises a microprocessor 51 which is in communication, via bus 54, with a transceiver 52 linked to an antenna 53. In this illustrated example, the transceiver 52 may comprise, for example, an Intersil PRISM-II integrated circuit based transceiver. As in the system described previously with respect to FIG. 1, a received signal strength indication (RSSI) is generated by transceiver 52 on line 55 which is input to microprocessor 51 and its on board analog-to-digital converter. However, while the system of FIG. 5 can make use of the RSSI signal, this system is distinguished from the system illustrated in FIG. 1 by its ability to provide bi-directional data communication from the transceiver 52. Thus, due to the increased sophistication of this system, a more powerful microprocessor may be used and is shown in FIG. 5 as including EEPROM 60 and I/O 61 driving a Universal Serial Bus ("USB") connection 62.

Figure 6:
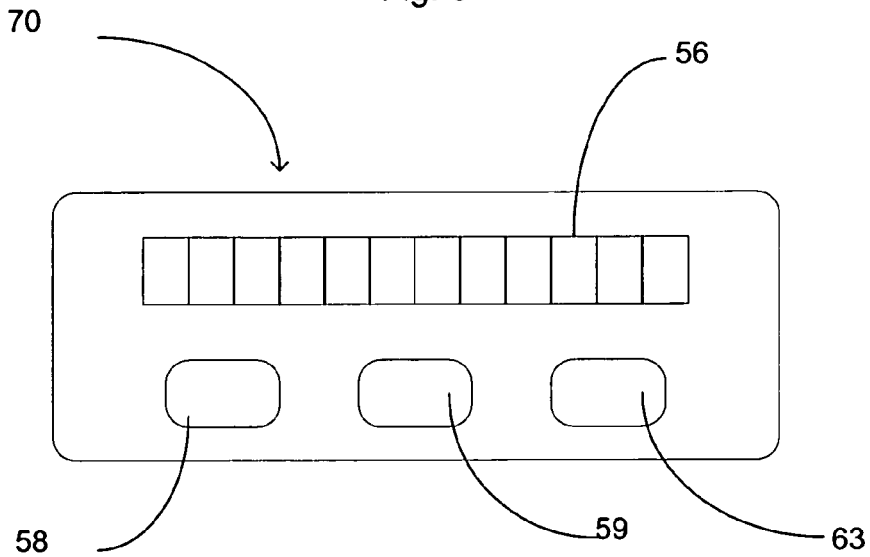
FIG. 6 illustrates the system of FIG. 5 embodied in a third handheld device.

For convenience of use, the system of FIG. 5 may be embodied in a handheld device 70 as is illustrated in FIG. 6. As illustrated in FIG. 6, the handheld device 70 may include a plurality of switches 58, 59, and 63 linked to the microprocessor 51. As previously described in connection with FIG. 1, one switch, e.g., 58, could be activated to cause the system to determine if a wireless network is present. Possible uses for switches 59 and 63, as well as an alphanumeric display 56 which is under the control of the microprocessor 51, will be described below.

Figure 7:
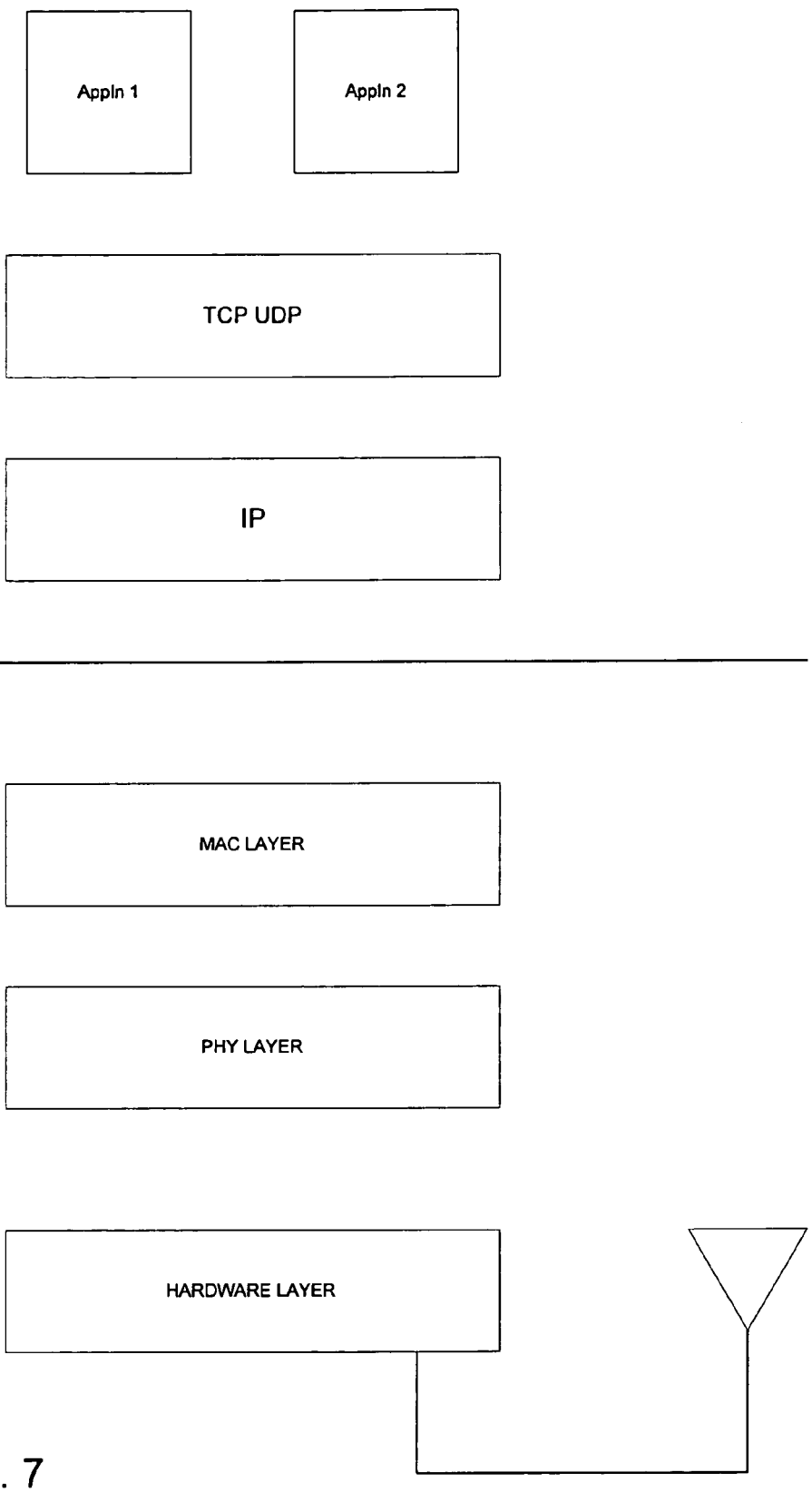
FIG. 7 illustrates a block diagram of software layers within the system of FIG. 5.

In operation, the system 50 can communicate bi-directionally with a wireless network and indeed other computers and servers accessible over the network and can, in turn, provide the user with enhanced functions that can be carried out all without ever turning on a computer. By way of example, the system 50 can serve to permit the user to actually issue a "ping" command to the network, for example, by activating switch 63. As illustrated in FIG. 7, the system architecture includes all the necessary components to execute such commands. By issuing a "ping" command, the user will cause the system 50 to attempt to establish contact with a computer server located outside of the network, operated by the wireless computer access point provider. A user may "ping" a known IP address corresponding to, for example, a familiar web site such as "yahoo.com." The "ping" command may or may not generate a response. Receiving a positive response to a "ping" command can serve to indicate to the user that the network is open and permit the user to have free access to the Internet and not just a server associated with the WAP operator's own site. The display 56 may be used to provide the user with information concerning the positive response. The particular Internet address configured for the automated "ping" operation can optionally be configured by interfacing with a personal computer via USB port 62 or in another embodiment, can optionally be configured wirelessly. By configuring the ping address to the user's own email server or corporate intranet login server, the user is able to confirm access to a specific desirable address.

Still further, the system 50 may be utilized to provide a much more powerful function whereby a user can determine whether or not the user has unread email in an appropriate email account—all without having to utilize their laptop or notebook computer. In operation, the user would merely press and hold, for example, the email button 59 on the device 50 to initiate a command sequence. Software resident on the system will cause microprocessor 51 to command the transceiver 52 to attempt to access the wireless computer network. Given the system architecture, the device can further be commanded to interrogate a POP3 email server to detect whether the user has any unread email and can receive an appropriate response and provide an indication to the user on display 56 stating, for example, that "the user has 7 unread messages." Yet further, the system 50 may be utilized to permit the mobile user to determine if anyone has attempted to "instant message" the user.

For retrieving email or "instant message" information, the system 50 would be configured to know the identity of the user and their POP3 server(s) and possibly other security parameters, all of which can be provided to the device via I/O 61 and USB connection 62. Using USB connection 62, the device can be connected to a PC which can permit the user to configure the system 50 with any information needed to access such accounts. USB port 62 can also be used to download other software commands necessary to make the system 50 compatible with the networks and/or servers to be accessed and to generally operate as intended. It is to be appreciated that the configuration of the system 50 can also be accomplished wirelessly.

From the foregoing, it will be understood that one very attractive use of the system 50 is the distribution of pre-configured devices by an email service operator and/or access point operator. Such an entity could distribute pre-configured/pre-programmed devices including the system 50 to its email account holders. Users in turn could then determine if they had unread mail thereby generating additional traffic to the service operator. Such devices could further be pre-configured to have limited functionality, for example, a device that permits the user to detect whether or not unread email exists on one and only one account, namely that associated with the entity issuing the device.

In the case of closed networks, the system 50 can be configured to transmit to the WAP the various protocols required for the user to log onto the network. The system 50 could listen for the appropriate response from the WAP, identify the network and determine indeed whether or not they are able to log onto the network and if so, ask to issue an appropriate predefined encryption key and/or password to the device to permit access to the network and its resources. The user can then use the system 50 to download the network set-up command to their computer via, for example, the USB connection 62. Thus, the system 50 can be configured to be operational with multiple networks, as well as provide an indication as to how strong the signal strength emanating from the access point is and other system parameters.

A limited purpose device including the system 50 could be provided which is populated with a single encryption key that limits use of the device to a single network and or limits the functionality of the device on the network that has multiple tiers of services. For example, the present apparatus could be configured to permit users to have trial access to a closed wireless network by setting up the various required authentications and other passwords. The device can be designed to have as much or as little functionality as the WAP provider/operator and/or wireless computer network operator so desires.

While various concepts have been described in detail, it will be appreciated by those skilled in the art that various modifications and alternatives to those concepts could be developed in light of the overall teachings of the disclosure. As such, the particular concepts disclosed are meant to be illustrative only and not limiting as to the scope of the invention which is to be given the full breadth of the appended claims and any equivalents thereof.

What is claimed is:

1. An apparatus for detecting the presence of a wireless Local Area Network (LAN) comprising:
   a radio frequency receiver for receiving radio frequency signals; and
   a controller having associated programming for controlling the receiver and measuring and analyzing the energy of the received radio frequency signals for the purpose of determining if the radio frequency signals indicate the presence of a wireless LAN or are being produced by a noise generating electronic device;
   wherein the programming functions to cause the apparatus to generally scan outside of a wireless LAN band to identify radio frequency signals outside of the wireless LAN band being generated by the noise generating electronic device also generating radio frequency signals inside the wireless LAN band.

2. The apparatus of claim 1, wherein the programming that functions to cause the apparatus to scan outside of the wireless LAN band functions to cause the apparatus to scan (i) frequencies lower than frequencies of the wireless LAN band, and (ii) frequencies greater than the frequencies of the wireless LAN band.

3. The apparatus of claim 2, wherein the wireless LAN band includes an 802.11 wireless network band.

4. The apparatus of claim 1, wherein the programming that functions to cause the apparatus to scan outside of the wireless LAN band functions to cause the apparatus to scan from a first frequency that is lower than the lowest frequency of the wireless LAN band to a second frequency that is greater than the greatest frequency of the wireless LAN band.

5. An apparatus for detecting the presence of a wireless Local Area Network (LAN) comprising:
   a radio frequency receiver for receiving radio frequency signals; and a controller having associated programming for controlling the receiver and measuring and analyzing the energy of the received radio frequency signals for the purpose of determining if the radio frequency signals indicate the presence of a wireless LAN or are being produced by a noise generating electronic device;

wherein the programming functions to (i) cause the apparatus to scan a substantial entirety of a wireless LAN band to determine an overall energy level over time, and (ii) determine the wireless LAN is present if the overall energy level exceeds a threshold and is substantially constant over the time.

6. The apparatus as recited in claim 5, wherein the programming functions to examine the overall energy level over time and, when the overall energy level exceeds a predefined threshold, the programming deems the radio frequency signals as originating from the wireless LAN.

7. The apparatus of claim 5, wherein the apparatus scans the substantial entirety of the wireless LAN band in incremental steps.

8. The apparatus of claim 7, wherein the incremental steps are 2 MHz steps.

9. The apparatus of claim 5,
wherein the wireless LAN band includes an 802.11 wireless network band, and
wherein the overall energy level is substantially constant over the time if the energy level is contained within one 802.11 channel of the 802.11 wireless network band.

10. A method for detecting the presence of a wireless Local Area Network (LAN), comprising:
receiving radio frequency signals;
measuring the energy level of the received radio signals;
analyzing the measured energy levels for the purpose of determining if the radio frequency signals indicate the presence of a wireless LAN or are being produced by a noise generating electronic device; and
generally scanning outside of a wireless LAN band to identify radio frequency signals outside of the wireless LAN band being generated by the noise generating electronic device also generating radio frequency signals inside the wireless LAN band.

11. The method of claim 10, wherein scanning outside of the wireless LAN band includes scanning (i) frequencies lower than frequencies of the wireless LAN band, and (ii) frequencies greater than the frequencies of the wireless LAN band.

12. The method of claim 11, wherein the wireless LAN band includes an 802.11 wireless network band.

13. The method of claim 10, wherein scanning outside of the wireless LAN band includes scanning from a first frequency that is lower than the lowest frequency of the wireless LAN band to a second frequency that is greater than the greatest frequency of the wireless LAN band.

14. A method for detecting the presence of a wireless Local Area Network (LAN), comprising:
receiving radio frequency signals;
measuring the energy level of the received radio signals;
analyzing the measured energy levels for the purpose of determining if the radio frequency signals indicate the presence of a wireless LAN or are being produced by a noise generating electronic device;
scanning a substantial entirety of a wireless LAN band to determine an overall energy level over time, and
determining the wireless LAN is present if the overall energy level exceeds a threshold and is substantially constant over the time.

15. The method as recited in claim 14, further comprising the step of examining the overall energy level over time and, when the overall energy level exceeds a predefined threshold, deeming the radio frequency signals as originating from a wireless LAN.

16. The method of claim 14, wherein scanning the substantial entirety of the wireless LAN band comprises scanning the wireless LAN band in incremental steps.

17. The method of claims 16, wherein the incremental steps are 2 MHz steps.

18. The method of claim 14,
wherein the wireless LAN band includes an 802.11 wireless network band, and
wherein determining the overall energy level is substantially constant over the time comprises determining the energy level is contained within one 802.11 channel of the 802.11 wireless network band.

19. In a handheld device, a readable medium having instructions for detecting the presence of a wireless Local Area Network (LAN), the instructions performing steps comprising:
receiving radio frequency signals;
measuring the energy level of the received radio signals;
analyzing the measured energy levels for the purpose of determining if the radio frequency signals indicate the presence of a wireless LAN or are being produced by a noise generating electronic device; and
generally scanning outside of a wireless LAN band to identify radio frequency signals outside of the wireless LAN band being generated by the noise generating electronic device also generating radio frequency signals inside the wireless LAN band.

20. The readable medium of claim 19, wherein scanning outside of the wireless LAN band includes scanning (i) frequencies lower than frequencies of the wireless LAN band, and (ii) frequencies greater than the frequencies of the wireless LAN band.

21. The readable medium of claim 20, wherein the wireless LAN band includes an 802.11 wireless network band.

22. The readable medium of claim 19, wherein scanning outside of the wireless LAN band includes scanning from a first frequency that is lower than the lowest frequency of the wireless LAN band to a second frequency that is greater than the greatest frequency of the wireless LAN band.

23. In a handheld device, a readable medium having instructions for detecting the presence of a wireless Local Area Network (LAN), the instructions performing steps comprising:
receiving radio frequency signals;
measuring the energy level of the received radio signals;
analyzing the measured energy levels for the purpose of determining if the radio frequency signals indicate the presence of a wireless LAN or are being produced by a noise generating electronic device;
scanning a substantial entirety of a wireless LAN band to determine an overall energy level over time, and
determining the wireless LAN is present if the overall energy level exceeds a threshold and is substantially constant over the time.

24. The readable media as recited in claim 23, wherein the instructions perform the further step of examining the overall energy level over time and, when the overall energy level exceeds a predefined threshold, deeming the radio frequency signals as originating from a wireless LAN.

25. The readable medium of claim 23, wherein scanning the substantial entirety of the wireless LAN band comprises scanning the wireless LAN band in incremental steps.

26. The readable medium of claim 25, wherein the incremental steps are 2 MHz steps.

27. The readable medium of claim 23,
wherein the wireless LAN band includes an 802.11 wireless network band, and wherein determining the overall energy level is substantially constant over the time comprises determining the energy level is contained within one 802.11 channel of the 802.11 wireless network band.

* * * * *